United States Patent
Seto et al.

(10) Patent No.: US 8,824,020 B2
(45) Date of Patent: Sep. 2, 2014

(54) IMAGE EDITING APPARATUS, IMAGE EDITING METHOD, IMAGE EDITING SYSTEM, AND RECORDING MEDIUM

(71) Applicant: FUJIFILM Corporation, Tokyo (JP)

(72) Inventors: Satoshi Seto, Tokyo (JP); Kakuya Ide, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/802,022

(22) Filed: Mar. 13, 2013

(65) Prior Publication Data

US 2013/0242351 A1     Sep. 19, 2013

(30) Foreign Application Priority Data

Mar. 15, 2012   (JP) ................. 2012-058570

(51) Int. Cl.
  *B41C 1/02*       (2006.01)
  *G06K 15/00*    (2006.01)

(52) U.S. Cl.
  USPC ..................................... 358/3.29; 358/1.18

(58) Field of Classification Search
  USPC ............. 358/3.29, 1.18, 1.13, 1.15, 1.16, 1.1, 358/1.9; 101/483
  See application file for complete search history.

(56) References Cited

U.S. PATENT DOCUMENTS

| | | | |
|---|---|---|---|
| 6,441,920 B1 * | 8/2002 | Smith | 358/1.2 |
| 7,542,155 B2 * | 6/2009 | Paskalev et al. | 358/1.13 |
| 7,812,997 B2 * | 10/2010 | Morales et al. | 358/1.18 |
| 2007/0013940 A1 | 1/2007 | Field | |
| 2007/0201079 A1 | 8/2007 | Caine | |
| 2012/0279409 A1 * | 11/2012 | Aylward et al. | 101/483 |

FOREIGN PATENT DOCUMENTS

| | | |
|---|---|---|
| JP | H10-213944 A | 8/1998 |
| JP | 2002-300370 A | 10/2002 |
| JP | 2004-500654 A | 1/2004 |
| JP | 2009-104454 A | 5/2009 |
| JP | 2010-231801 A | 10/2010 |
| JP | 2010-250840 A | 11/2010 |
| WO | WO 01/55869 A1 | 8/2001 |
| WO | WO 01/96118 A1 | 12/2001 |

OTHER PUBLICATIONS

European Search Report of EP13159179 dated May 13, 2014.

* cited by examiner

*Primary Examiner* — Charlotte M Baker
(74) *Attorney, Agent, or Firm* — Birch, Stewart, Kolasch & Birch, LLP

(57) ABSTRACT

An image editing apparatus is configured to determine two or more scheduled disposition regions in a predetermined region on a printing plate or an output medium, and to gang two or more content images for the respective disposition regions. The apparatus includes: a ganging information managing unit that sequentially manages first list information regarding plural print jobs and second list information regarding assignment states of the print jobs; a job assigning unit that assigns the disposition regions to at least one print job; a ganging state monitoring unit that sequentially monitors the first and second list information and determines whether there is at least one combination of the print jobs which have not been assigned and the disposition regions; and a monitoring result informing unit that informs a user of there being the combination in a case where the ganging state monitoring unit determines that there is the combination.

7 Claims, 15 Drawing Sheets

FIG. 4

SET GANGING — W1

FILE (F)  EDIT (E)  VIEW (V)  HELP (H)

[CREATE NEW JOB]  [CREATE GANGING TASK]

JOB LIST | GANGING STATE

| ORDER RECEPTION NUMBER | CUSTOMER | DUE DATE | NUMBER OF COLORS | QUANTITY | PAPER TYPE | GRAIN DIRECTION | DEVEL-OPMENT SIZE | ITEM |
|---|---|---|---|---|---|---|---|---|
| 111007-0087 | IDE COMPANY | 2/24 | 4/4 | 4000 | COAT<73> | ↔ | A3 | A4 FOLDED PAMPHLET |
| 080622-0418 | Wing Coffee | 2/26 | 4/4 | 1500 | REPRODUC-TION COAT<90> | ↔ | A4 | THREE-FOLDED PAMPHLET |
| 080622-0417 | Wing Coffee | 2/26 | 4/4 | 2000 | REPRODUC-TION COAT<90> | ↔ | 140X140 | FLYER |
| 101230-0567 | SIMPLE REALTY | 2/25 | 4/1 | 3000 | COAT<90> |  | A4 | FLYER |
| 100924-0448 | FGS | 2/28 | 4/2 | 1000 | HIGH QUALITY<180> | ↕ | BUSINESS CARD | BUSINESS CARD |
| 100924-0447 | FGS | 2/28 | 4/2 | 1000 | HIGH QUALITY<180> | ↕ | BUSINESS CARD | BUSINESS CARD |
| 111007-0178 | Wing Coffee | 2/26 | 4/0 | 2000 | HIGH QUALITY<90> |  | A5 | FLYER |
| 090809-0839 | IDE COMPANY | 2/27 | 4/4 | 2000 | REPRODUC-TION COAT<90> |  | A4 | FLYER |

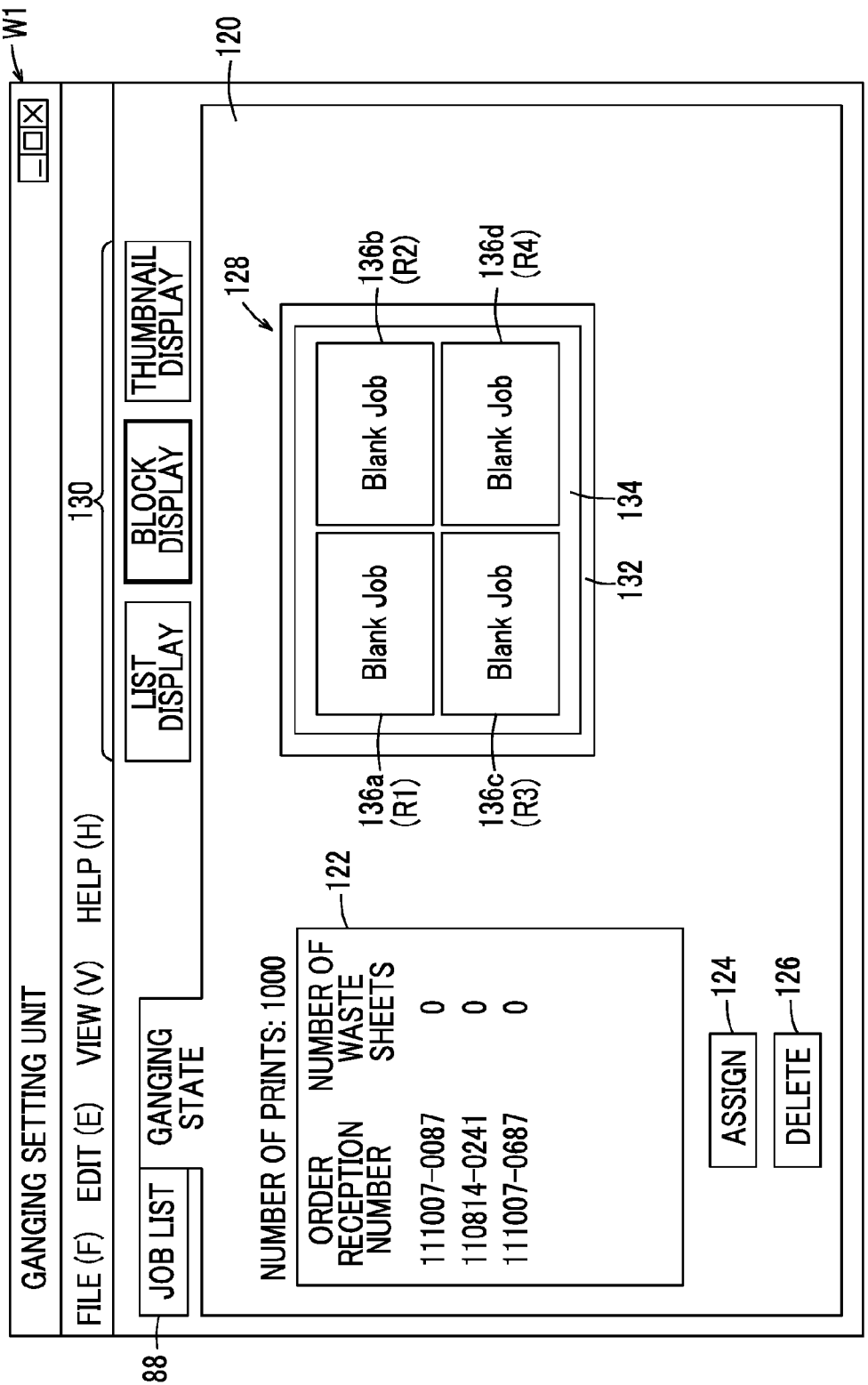

FIG. 7B

| REGION NUMBER | GANGING TASK | PAPER TYPE | GRAIN DIRECTION | QUANTITY | DEVEL- OPMENT SIZE | ASSIGNED JOB |
|---|---|---|---|---|---|---|
| 1 | | | | | | NULL |
| 2 | TASK-1 | REPRODUCTION COAT<90> | ↔ | 1000 | A3 | NULL |
| 3 | | | | | | NULL |
| 4 | | | | | | NULL |
| ⋯⋯ | ⋯⋯ | ⋯⋯ | ⋯⋯ | ⋯⋯ | ⋯⋯ | ⋯⋯ |

L2

IMAGE EDITING APPARATUS, IMAGE EDITING METHOD, IMAGE EDITING SYSTEM, AND RECORDING MEDIUM

BACKGROUND OF THE INVENTION

1. Field of the Invention

The present invention relates to an image editing apparatus, an image editing method, an image editing system, and a recording medium, in which two or more scheduled disposition regions which do not overlap each other are determined in a predetermined region on a printing plate or an output medium, and two or more content images are ganged for the respective scheduled disposition regions.

2. Description of the Related Art

In recent years, in a printing field, with the widespread use of DTP (DeskTop Publishing) or CTP (Computer To Plate), the workflow of a printing process has been entirely digitalized. For example, various techniques regarding "ganging" in which a plurality of print jobs are assigned and disposed on a printing plate (or an output medium) with a large size have been proposed in order to reduce costs for producing printed matters.

JP2009-104454A (paragraphs [0005] to [0007], and the like) proposes an apparatus and a method in which print jobs which are collectively stored and managed are classified for each printing condition and are imposed (ganged) in a timely manner according to input circumstances of the print jobs or a state of a printing apparatus. Thereby, an indefinite number of print jobs which intermittently occur can be efficiently printed.

SUMMARY OF THE INVENTION

Meanwhile, the time period from the reception of an order for printed matters to the due date thereof may vary depending on the kinds of printed matters or circumstances of purchasers. For this reason, there are cases where the print jobs which have the earlier due date are preferentially assigned and ganged instead of preferentially assigning the print jobs of according to the receipt of order so as to further reduce printing costs. For example, if content images are sequentially disposed on a printing plate and then there are no other content images (print jobs) which can be disposed in blank disposition regions, an operator as a user may stop (suspends) the ganging work until a new print job satisfying the disposition condition is registered. In addition, the operator is required to fix the disposition of the content images or to change the disposition in a timely manner, depending on registration circumstances of print jobs.

However, in the apparatus and the method proposed by JP2009-104454A (paragraphs to [0007], and the like), the operator is not able to know the progress circumstances of ganging until the disposition of all the content images is fixed. In addition, the advanced judgment by the operator according to circumstances, which vary from hour to hour, cannot be reflected on the ganging work.

On the other hand, if the confirmation, judgment and disposition works of content images are totally left to the operator, the presence of a print job close to the due date may be overlooked or may be left in a state where a ganging work is in progress among a large number of print jobs.

The present invention has been made to solve the above-described problems, and an object thereof is to provide an image editing apparatus, an image editing method, an image editing system, and a recording medium, capable of preventing an oversight and the like due to carelessness of a user and further improving efficiency of a ganging work.

According to an aspect of the present invention, there is provided an image editing apparatus configured to determine two or more scheduled disposition regions, which do not overlap each other, in a predetermined region on a printing plate or an output medium and gang two or more content images for the respective scheduled disposition regions. The image editing apparatus includes: a ganging information managing unit that sequentially manages first list information regarding a plurality of print jobs and second list information regarding assignment states of the print jobs corresponding to the respective scheduled disposition regions; a job assigning unit that assigns the scheduled disposition regions to at least one print job satisfying a predetermined disposition approval condition among the plurality of print jobs indicated by the first list information; a ganging state monitoring unit that sequentially monitors the first list information and the second list information managed by the ganging information managing unit and determines whether or not there is at least one combination of the print jobs which have not been assigned yet by the job assigning unit and the scheduled disposition regions; and a monitoring result informing unit that informs a user of there being the combination in a case where the ganging state monitoring unit determines that there is the combination.

As described above, since the ganging information managing unit that sequentially manages first list information regarding a plurality of print jobs and second list information regarding assignment states of the print jobs corresponding to the respective scheduled disposition regions, and the ganging state monitoring unit that sequentially monitors the managed first list information and second list information and determines whether or not there is at least one combination of the print jobs which have not been assigned yet and the scheduled disposition regions, are provided, a gradual ganging work appropriate for circumstances of print jobs which are sequentially managed can be executed. In addition, since the monitoring result informing unit that informs a user of there being the combination in a case where it is determined that there is the combination in which the assignment has not been performed yet is provided, a frequency of states in which the ganging work performed with the units of the printing plate or the output medium is in progress can be reduced. Thereby, an oversight or the like due to carelessness of a user can be prevented and efficiency of the ganging work can be further improved.

The image editing apparatus may further include a simulation image generating unit that generates a simulation image, which is an image imitating a form of ganging on the printing plate or the output medium and which indicates an assignment state of each of the print jobs in an identifiable manner. Thereby, a user can understand assignment states of the print jobs at a glance.

In addition, the first list information may include due dates of printed matters regarding the print jobs, and the ganging state monitoring unit determines whether or not there is the combination in chronological order beginning with the print job having an earliest due date. This can prevent in advance a possibility that a due date of a printed matter may lapse.

According to another aspect of the present invention, there is provided an image editing method for determining two or more scheduled disposition regions, which do not overlap each other, in a predetermined region on a printing plate or an output medium and ganging two or more content images for the respective scheduled disposition regions. The image editing method includes: sequentially managing first list information regarding a plurality of print jobs and second list information regarding assignment states of the print jobs corresponding to the respective scheduled disposition regions; assigning the scheduled disposition regions to at least one print job satisfying a predetermined disposition approval condition among the plurality of print jobs indicated by the first list information; sequentially monitoring the managed first list information and second list information so as to determine whether or not there is at least one combination of the print jobs which have not been assigned yet and the scheduled disposition regions; and informing a user of there being the combination in a case where it is determined that there is the combination.

According to another aspect of the present invention, there is provided an image editing system configured to determine two or more scheduled disposition regions, which do not overlap each other, in a predetermined region on a printing plate or an output medium and gang two or more content images for the respective scheduled disposition regions. The image editing system includes: a ganging information managing unit that sequentially manages first list information regarding a plurality of print jobs and second list information regarding assignment states of the print jobs corresponding to the respective scheduled disposition regions; a job assigning unit that assigns the scheduled disposition regions to at least one print job satisfying a predetermined disposition approval condition among the plurality of print jobs indicated by the first list information; a ganging state monitoring unit that sequentially monitors the first list information and the second list information managed by the ganging information managing unit and determines whether or not there is at least one combination of the print jobs which have not been assigned yet by the job assigning unit and the scheduled disposition regions; and a monitoring result informing unit that informs a user of there being the combination in a case where the ganging state monitoring unit determines that there is a combination.

According to another aspect of the present invention, there is provided a non-transitory computer-readable recording medium storing therein a program that causes a computer to operate as an image editing apparatus configured to determine two or more scheduled disposition regions, which do not overlap each other, in a predetermined region on a printing plate or an output medium and to gang two or more content images for the respective scheduled disposition regions. The image editing apparatus includes: a ganging information managing unit that sequentially manages first list information regarding a plurality of print jobs and second list information regarding assignment states of the print jobs corresponding to the respective scheduled disposition regions; a job assigning unit that assigns the scheduled disposition regions to at least one print job satisfying a predetermined disposition approval condition among the plurality of print jobs indicated by the first list information; a ganging state monitoring unit that sequentially monitors the first list information and the second list information managed by the ganging information managing unit and determines whether or not there is at least one combination of the print jobs which have not been assigned yet by the job assigning unit and the scheduled disposition regions; and a monitoring result informing unit that informs a user of there being the combination in a case where the ganging state monitoring unit determines that there is a combination.

According to the image editing apparatus, the image editing method, the image editing system, and the recording medium related to the aspects of the present invention, since the ganging information managing unit that sequentially manages first list information regarding a plurality of print jobs and second list information regarding assignment states of the print jobs corresponding to the respective scheduled disposition regions, and the ganging state monitoring unit that sequentially monitors the managed first list information and second list information and determines whether or not there is at least one combination of the print jobs which have not been assigned yet and the scheduled disposition regions, are provided, a gradual ganging work appropriate for circumstances of print jobs, which are sequentially managed, can be executed. In addition, since the monitoring result informing unit that informs a user of there being the combination in a case it is determined that there is a combination in which the assignment has not been performed yet is provided, a frequency of states in which the ganging work performed with the units of the printing plate or the output medium is in progress can be reduced. Thereby, an oversight or the like due to carelessness of a user can be prevented and efficiency of the ganging work can be further improved.

BRIEF DESCRIPTION OF THE DRAWINGS

FIG. 6 is an image view illustrating a second state of the setting screen.

FIG. 7B is a schematic diagram of a ganging list in an initial state.

DESCRIPTION OF THE PREFERRED EMBODIMENTS

Hereinafter, an image editing method according to the present invention will be described with reference to the accompanying drawings, using an embodiment which is preferable in the relationship with an image editing apparatus performing the image editing method, a recording medium storing a program therein, and an image editing system.

Figure 1:
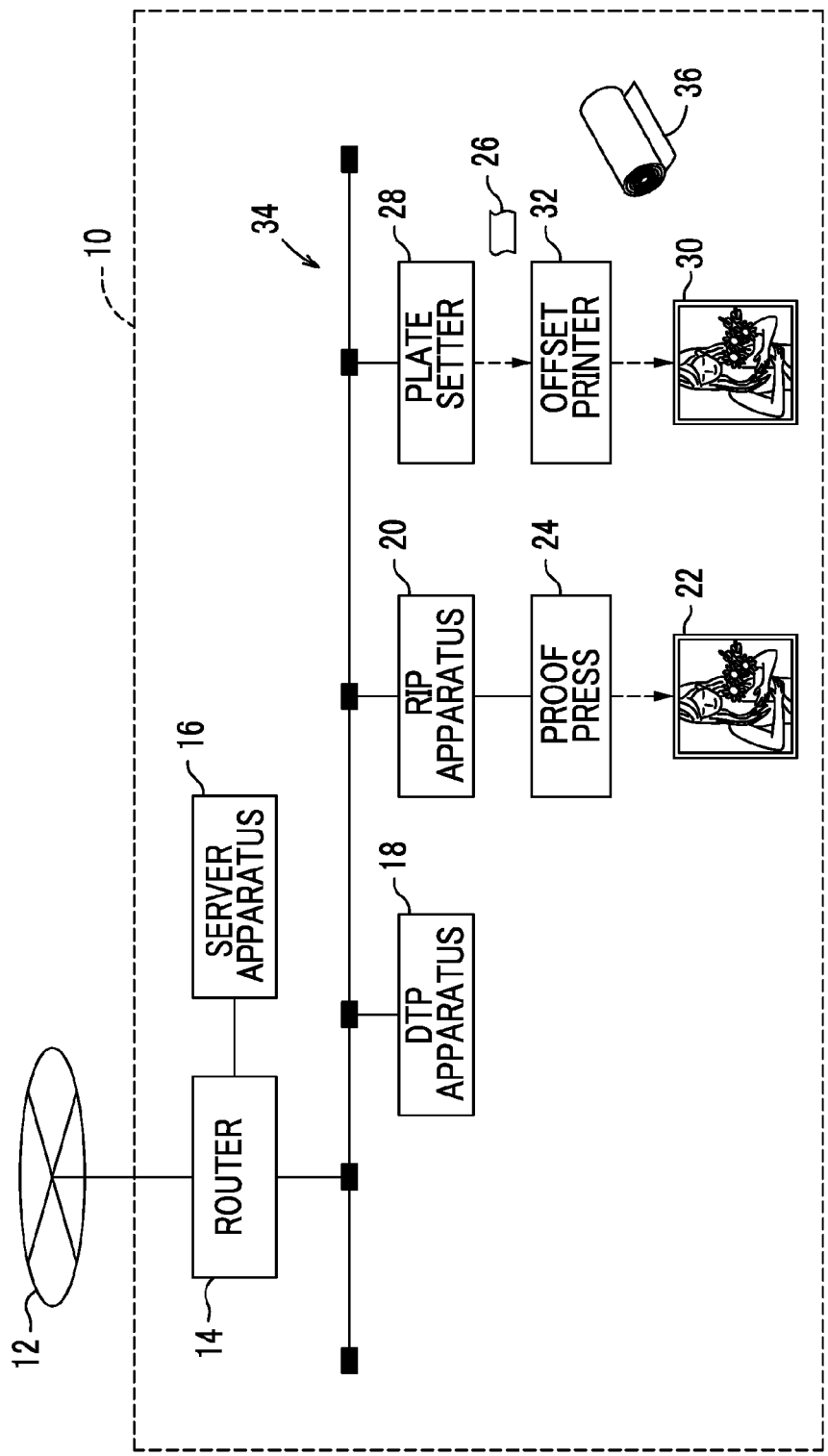
FIG. 1 is a schematic configuration diagram of a printed matter producing system into which a DTP apparatus which is an image editing apparatus according to the present embodiment is incorporated.

FIG. 1 is a schematic configuration diagram of a printed matter producing system 10 into which a DTP apparatus 18 which is an image editing apparatus according to the present embodiment.

The printed matter producing system 10 includes: a router 14 which is an apparatus relaying the connection between the printed system 10 and a network 12; a server apparatus 16 which is accessed by each terminal apparatus (not illustrated) belonging to an external network via the network 12; the DTP apparatus 18 (image editing apparatus) which performs DTP (Desktop Publishing) processes including editing and the like of content data acquired from the server apparatus 16; an RIP apparatus 20 which performs image processes such as a rasterization process or a color conversion process based on proofreading data or plate making data generated by the DTP apparatus 18; a proof press 24 which prints a proof 22 based on processed proofreading data transmitted from the RIP apparatus 20; a plate setter 28 which manufactures a printing plate 26 based on plate making data transmitted from the RIP apparatus 20, and an offset printer 32 which prints a printed matter 30 by installing the printing plate 26 therein.

The server apparatus 16 manages a workflow in the printed matter producing system 10. The server apparatus 16 is communicatively connected to each terminal apparatus of a designer and/or a production company (not illustrated) via the router 14 and the network 12. In addition, the server apparatus 16 is communicatively connected to the DTP apparatus 18, the RIP apparatus 20, and the plate setter 28 via a LAN (Local Area Network) 34 built in the printed matter producing system 10.

In other words, the server apparatus 16 is configured to execute a function as a file server storing and transmitting a variety of data files, a function as an authority management server managing a task authority executed in each terminal apparatus, each user or each print job, or a function as a mail server generating and sending a notification mail at a predetermined timing such as start or finish of each process. In addition, a variety of data files which are managed by the server apparatus 16 as the file server include, for example, content data, proofreading data, plate making data, a job ticket {for example, JDF (Job Definition Format) file}, ICC (International Color Consortium) profile, color sample data, a variety of information regarding ganging (hereinafter, referred to as ganging information), and the like.

The DTP apparatus 18 performs a pre-flight process on content data formed by characters, figures, patterns, pictures, or the like and then generates editing data with the page units. In addition, the DTP apparatus 18 refers to tag information of a job ticket and performs an imposition process (including ganging) according to a designated binding method or paper folding method.

The RIP apparatus 20 functions as a printing process server for at least one printer. In the example of FIG. 1, the RIP apparatus 20 is connected to the proof press 24 and the plate setter 28 so as to communicate. In this case, the RIP apparatus 20 performs a rasterization process on proofreading data (including proofreading-completed data) which is described with a page description language, and supplies obtained printing data to the proof press 24 (or the plate setter 28). The rasterization process includes a data form conversion process for converting data from a PDL (Page Description Language) form to a raster form, and a color matching process using an ICC profile.

The proof press 24 prints the proof 22 based on the printing data supplied from the RIP apparatus 20. As the proof press 24, DDCP (Direct Digital Color Proofing), an ink jet color proofer, a color laser printer (electrophotographic type) or an ink jet printer with a low resolution, or the like may be used.

The offset printer 32 transfers ink onto the paper 36 (output medium) via the printing plate 26 and an intermediate transfer body (not illustrated) so as to form the printed matter 30. In addition, a digital printer for direct printing may be provided instead of the offset printer 32. As the digital printer, an ink jet color printer, a color laser printer (electrophotographic type), or the like may be used.

Figure 2:
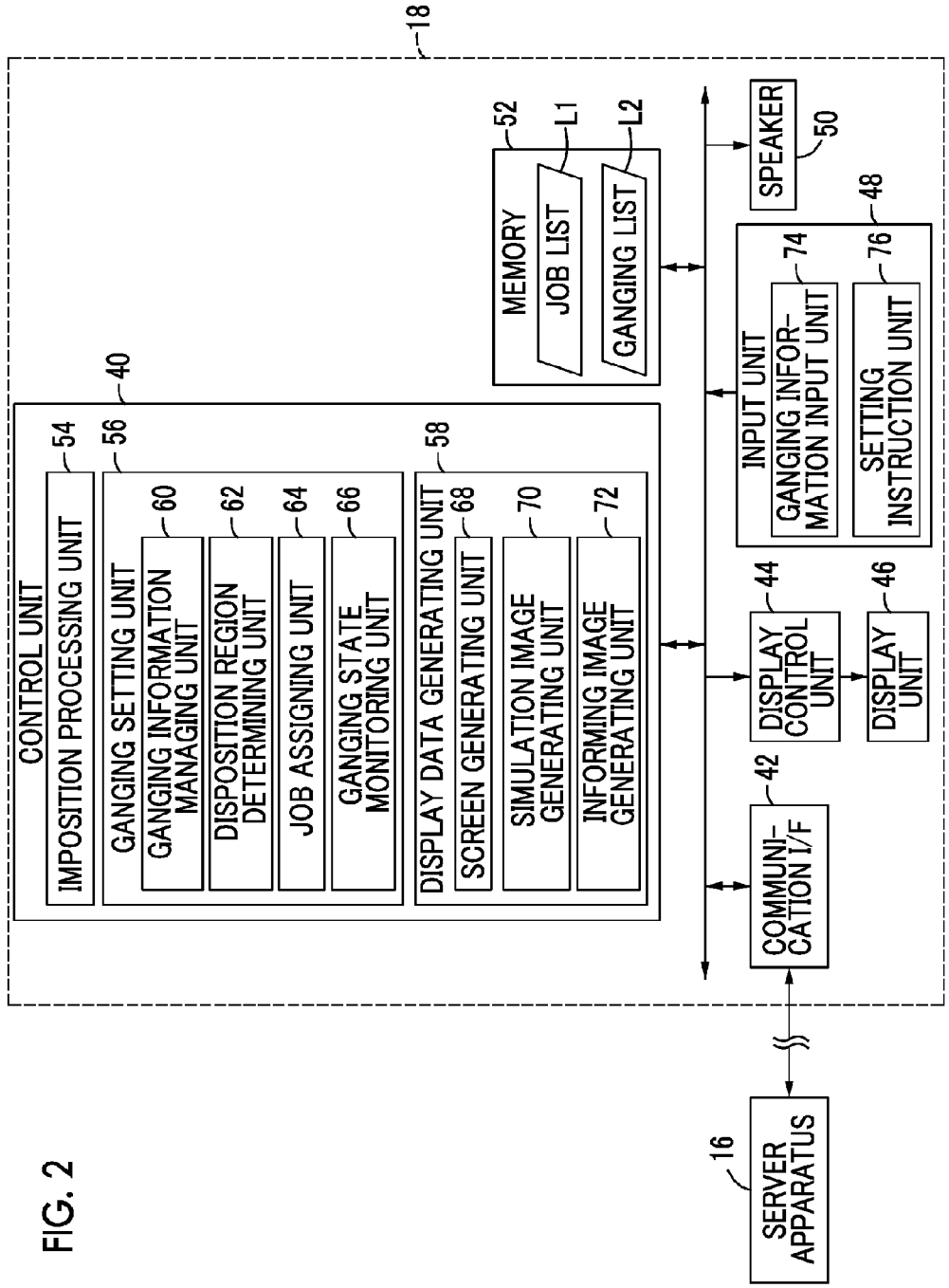
FIG. 2 is an electrical block diagram of the DTP apparatus illustrated in FIG. 1.

FIG. 2 is an electrical block diagram of the DTP apparatus 18 illustrated in FIG. 1.

The DTP apparatus 18 includes a control unit 40, a communication I/F 42, a display control unit 44, a display unit 46 (a monitoring result informing unit), an input unit 48, a speaker 50 (a monitoring result informing unit), and a memory 52 (storage medium).

The communication I/F 42 is an interface which transmits and receives an electronic signal from and to an external device. For example, a variety of information such as proofreading data, plate making data, ICC profile, and ganging information which are managed and preserved in the server apparatus 16 (refer to FIG. 1) can be acquired.

The display control unit 44 is a control circuit which controls driving of the display unit 46 under the control of the control unit 40. The display control unit 44 outputs a display control signal to the display unit 46 via an interface (not illustrated) so as to drive the display unit 46. Thereby, the display unit 46 can display various images including a window W1 (refer to FIG. 4 and the like), a window W2 (refer to FIG. 5), and a window W3 (refer to FIG. 11 and the like).

The speaker 50 outputs a sound (for example, a warning sound) for informing an operator as a user in response to an instruction from the control unit 40.

The memory 52 stores programs, data, and the like which are required for the control unit 40 to control each constituent element. In this figure, a job list L1 (first list information) and a ganging list L2 (second list information) described later are illustrated. The memory 52 may be a storage medium such as a nonvolatile memory or a hard disk.

The control unit 40 is constituted by a processor such as a CPU (Central Processing Unit). The control unit 40 executes the programs stored in the memory 52, thereby realizing respective functions of an imposition processing unit 54, a ganging setting unit 56, and a display data generating unit 58.

The imposition processing unit 54 performs a pre-flight process on input material data (content data) and performs an imposition process according to a designated binding method or paper folding method.

The ganging setting unit 56 generates a task for the setting of ganging (hereinafter, referred to as a ganging task) and performs various settings regarding ganging. Specifically, the ganging setting unit 56 includes a ganging information managing unit 60 which sequentially updates and manages list information (hereinafter, referred to as a job list L1) regarding a plurality of print jobs satisfying predetermined conditions and list information (hereinafter, referred to as a ganging list L2) regarding an assignment state of a print job in each ganging task. The ganging setting unit 56 furthermore includes a disposition region determining unit 62 which determines two or more scheduled disposition regions R1 to R4 (refer to FIG. 6 and the like) of content images in a predetermined region on the printing plate 26 or the paper 36. The ganging setting unit 56 furthermore includes a job assigning unit 64 which appropriately assigns a print job satisfying a disposition approval condition to each of the scheduled disposition regions R1 and the like determined by the disposition region determining unit 62. The ganging setting unit 56 furthermore includes a ganging state monitoring unit 66 which monitors contents of the job list L1 and the ganging list L2 managed by the ganging information managing unit 60 and determines whether or not there is a combination of a print job which can be assigned and the scheduled disposition region R1 or the like.

The display data generating unit 58 includes a screen generating unit 68 which generates a setting screen 80 (refer to FIG. 4), an editing screen 100 (refer to FIG. 5), and the like.

The display data generating unit 58 further includes a simulation image generating unit 70 which generates a simulation image 128 (refer to FIG. 6) and a simulation image 138 (refer to FIG. 12) which are images imitating a form of ganging and show an assignment state of each print job in an identifiable manner, and an informing image generating unit 72 which generates a visual image (hereinafter, referred to as an informing image) for informing the operator of a result monitored by the ganging state monitoring unit 66.

The input unit 48 is constituted by various input devices such as a mouse, a track ball, and a keyboard. The input unit 48 functions as a ganging information input unit 74 which inputs ganging information (information regarding the settings of ganging) and a setting instruction unit 76 which instructs the setting of ganging.

Figure 3:
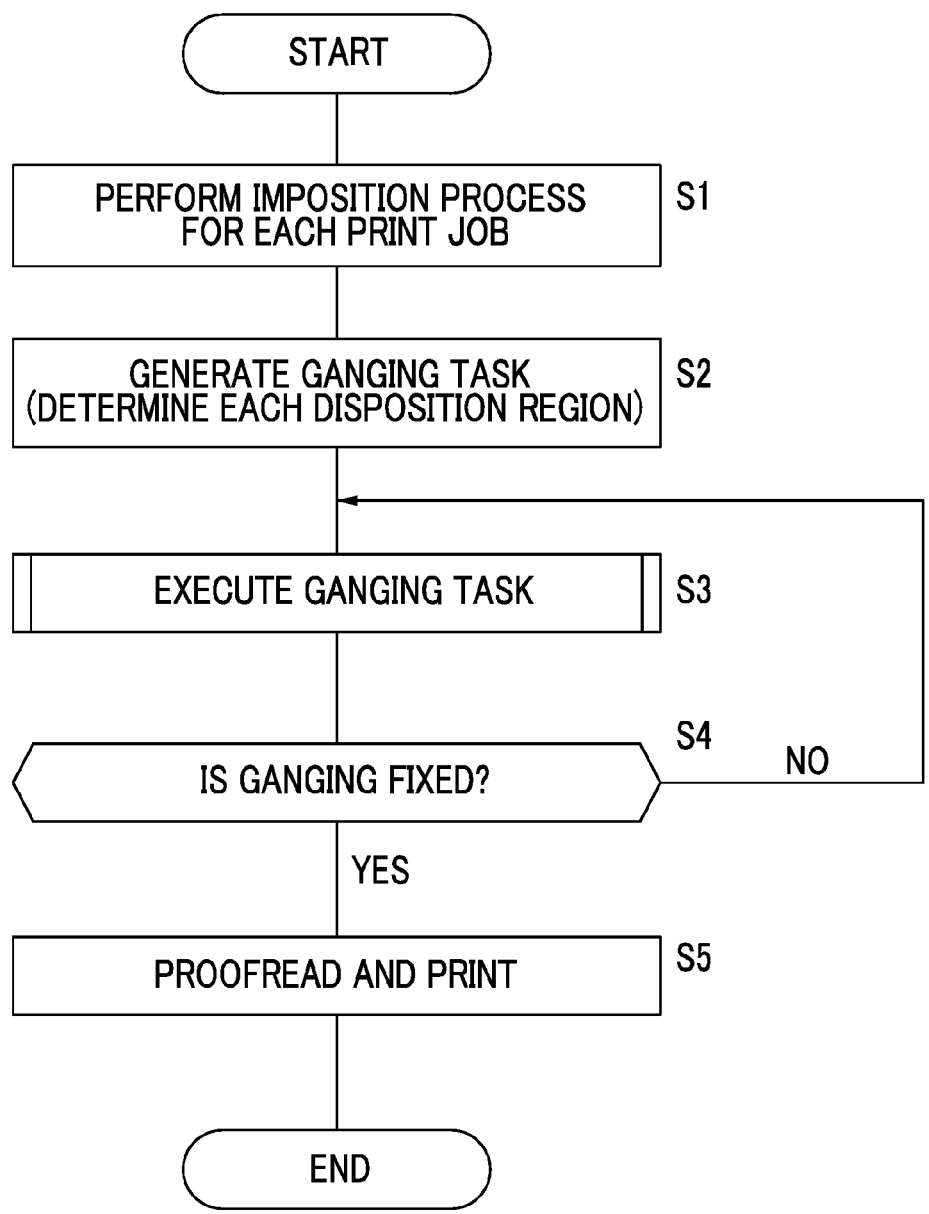
FIG. 3 is a flowchart illustrating a ganging workflow.

The DTP apparatus 18 which is an image editing apparatus according to the present embodiment is configured as described above. Next, an operation of the DTP apparatus 18 will be described in detail with reference to a flowchart of FIG. 3.

In step S1, the imposition processing unit 54 performs an imposition process on a content image for each print job. Specifically, the imposition processing unit 54 performs a pre-flight process on input material data (content data) and then performs an imposition process according to a designated binding method or paper folding method. In addition, the DTP apparatus 18 transmits obtained imposition information to an external device via the communication I/F 42 in order to store the imposition information in the server apparatus 16.

In step S2, the ganging setting unit 56 generates a new ganging task in response to a predetermined operation by the operator. Before the generation, the screen generating unit 68 generates display data of the setting screen 80 and supplies the display data to the display control unit 44. In addition, the display control unit 44 displays the window W1 (including the setting screen 80) on the display unit 46.

Figure 4:
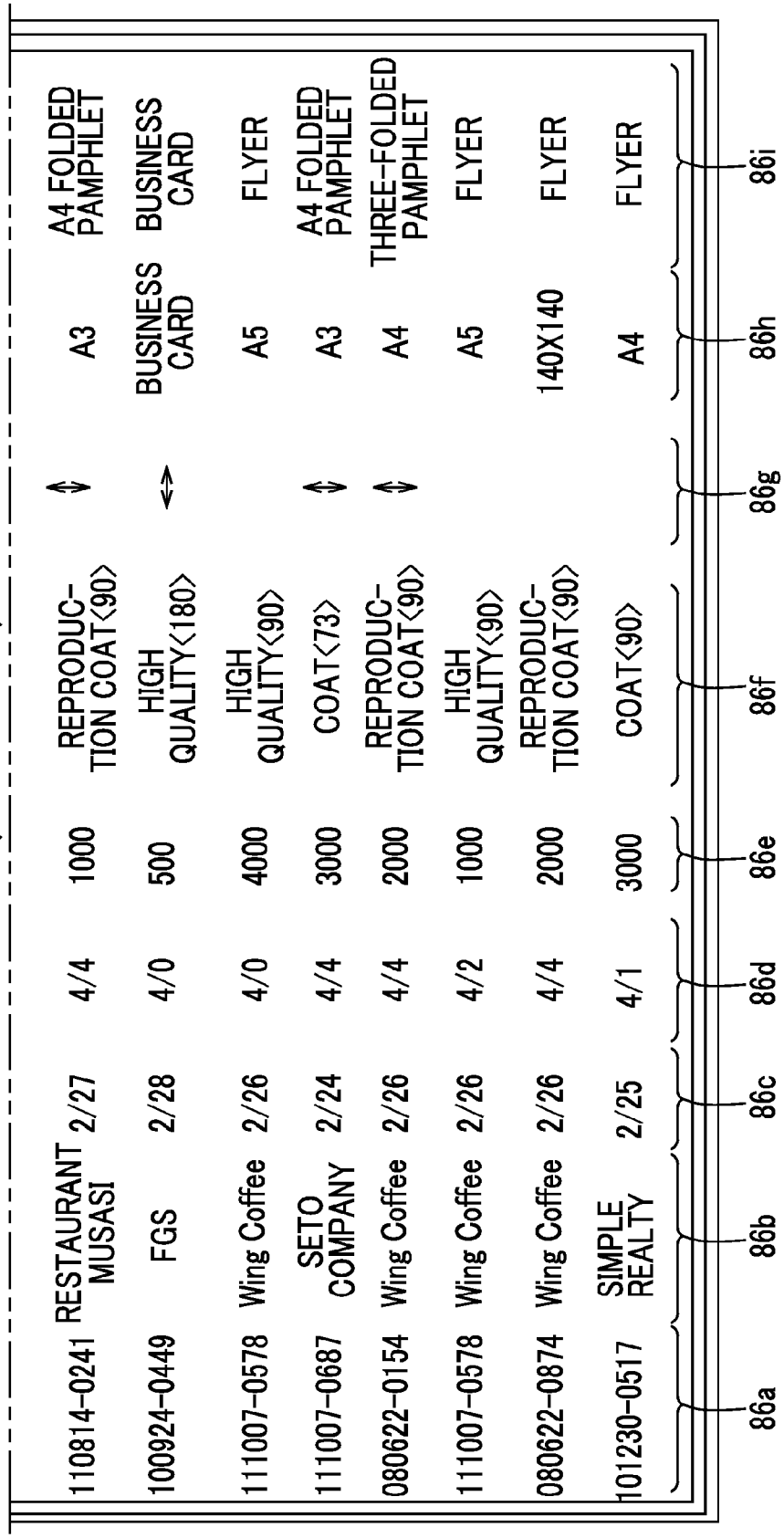
FIG. 4 is an image view illustrating a first state of a setting screen.

As illustrated in FIG. 4, a button 82 expressed by "new job creation", a button 84 expressed by "ganging task creation", and information column 86 indicating list information of print jobs which are currently registered are disposed in order from the upper side of the screen in the setting screen 80.

In the information column 86, sixteen print jobs are displayed in a list form. In addition, the contents (attributes) of eight kinds of condition categories are expressed for each print job. Specifically, the information column 86 is provided with a small column 86a indicating an order reception number, a small column 86b indicating the name of a customer, a small column 86c indicating a due date (for example, a delivery date), a small column 86d indicating the number of color plates, a small column 86e indicating a quantity (for example, the number of prints), a small column 86f indicating a type of paper 36, a small column 86g indicating a grain direction, a small column 86h indicating a development size, and a small column 86i indicating an item.

In response to a clicking operation of the [ganging task creation] button 84, the screen generating unit 68 generates display data of the editing screen 100 and supplies the display data to the display control unit 44. In addition, the display control unit 44 displays the window W2 (including the editing screen 100) on the display unit 46.

Figure 5:
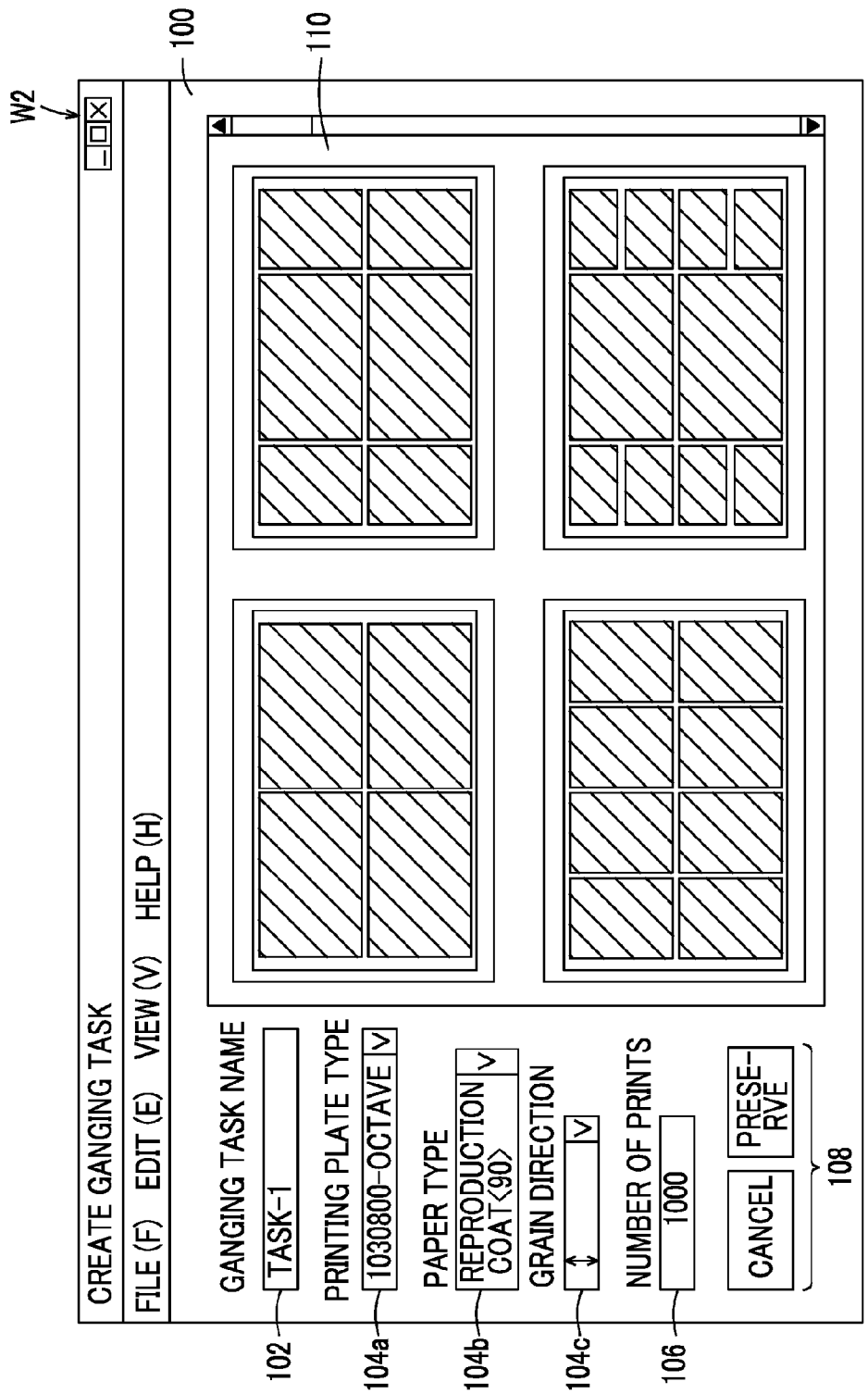
FIG. 5 is an image view illustrating an example of the editing screen.

As illustrated in FIG. 5, a single text box 102, three pull-down menus 104a, 104b and 104c, a single text box 106, two buttons 108, and a template column 110 are disposed in order from the left of the screen in the editing screen 100. Here, the text box 102, the respective pull-down menus 104a to 104c, the text box 106, and the template column 110 function as the ganging information input unit 74. In addition, the buttons 108 (specifically, a [preserve] button) functions as the setting instruction unit 76.

In the template column 110, a plurality (four kinds) of template images are displayed side by side. For example, a plurality of ganging templates which are prepared in advance may be provided so as to be selected, or, the templates may be provided so as to be edited according to the operator's taste.

The operator sets various conditions regarding a new ganging task which the operator intends to create on the editing screen 100. In this embodiment, in response to an input operation by the operator, for example, "TASK-1" (the text box 102) is set as the registration name of a ganging task, "1030× 800-octavo" (the pull-down menu 104a) is set as the kind of printing plate, "reproduction coat 1030×800<90>" (basis weight: 90 g/m$^2$)" (the pull-down menu 104b) is set as a paper type, "vertical direction" (the pull-down menu 104c) is set as a grain direction, "1000" (the text box 106) is set as the number of prints, and equal division of 2×2 (the template column 110) is set as an overall layout.

The ganging setting unit 56 generates a new ganging task according to the above-described various conditions in response to a clicking operation of the button 108 (the "save" button). Along therewith, the disposition region determining unit 62 determines two or more scheduled disposition regions (here, four scheduled disposition regions R1 to R4) in a pre-determined region of the printing plate 26 or the paper 36. In this embodiment, the predetermined region is a region, for example, which is the same as or smaller than a printable region on the printing plate 26 or the paper 36.

In step S3, the ganging setting unit 56 executes the ganging task generated in step S2 In addition, although, in the present embodiment, for convenience of description, a case where the number of ganging tasks is one is described as an example, two or more ganging tasks may be present.

In response to a clicking operation of a tab 88 (refer to FIG. 4), the display control unit 44 replaces the setting screen 80 (refer to FIG. 4) with a new setting screen 120 illustrated in FIG. 6 which is displayed on the display unit 46. Before the display, the simulation image generating unit 70 generates a simulation image 128 (refer to FIG. 6) which imitates a form of ganging. In addition, the screen generating unit 68 generates display data of the setting screen 120 and supplies the display data to the display control unit 44.

In the setting screen 120 illustrated in FIG. 6, information column 122 indicating list information regarding a predetermined print job, a button 124 expressed by [assign], a button 126 expressed by [delete], the simulation image 128 generated by the simulation image generating unit 70 (refer to FIG. 2), and a button group 130 are disposed in order from the left of the screen. Here, the [assign] button 124 functions as the setting instruction unit 76.

In the information column 122, the order reception numbers of print jobs and the number of waste sheets are displayed. Here, the "number of waste sheets" indicates the number of printed matters (broken sets), which are actually printed on the paper 36 but are not used as a product.

The simulation image 128 includes a first image 132 having a rectangular shape which imitates the printing plate 26, a second image 134 having a rectangular shape which imitates a printable region (predetermined region) in the printing plate 26, and four virtual content images 136a to 136d indicating the scheduled disposition regions R1 to R4 of content images. In addition, the first image 132, the second image 134, and the virtual content images 136a to 136d are superimposed from the far side to the closer side. The respective content images 136a to 136d are disposed in a positional relationship of not overlapping each other.

Further, alphabetic characters "Blank Job" are respectively expressed in the virtual content images 136a to 136d, and the background parts thereof (a solid color in the example of this figure) is colored in a first color. This display state indicates that all the scheduled disposition regions R1 to R4 are in a "blank state". In the present embodiment, the "blank state" indicates a state in which a print job is not assigned to the determined scheduled disposition regions R1 or the like, or a content image to be disposed is not determined.

The button group 130 is buttons for changing a display form of the simulation image 128 according to a preference of the operator. The simulation image 128 can be displayed in a list form so as to correspond to respective ganging tasks through a clicking operation of [list display]. The simulation image 128 can be displayed as being appended with detailed information including an order reception number through a clicking operation of [block display]. The simulation image 128 can be displayed so as to actually dispose thumbnails of content images through a clicking operation of [thumbnail display].

Figure 7A:
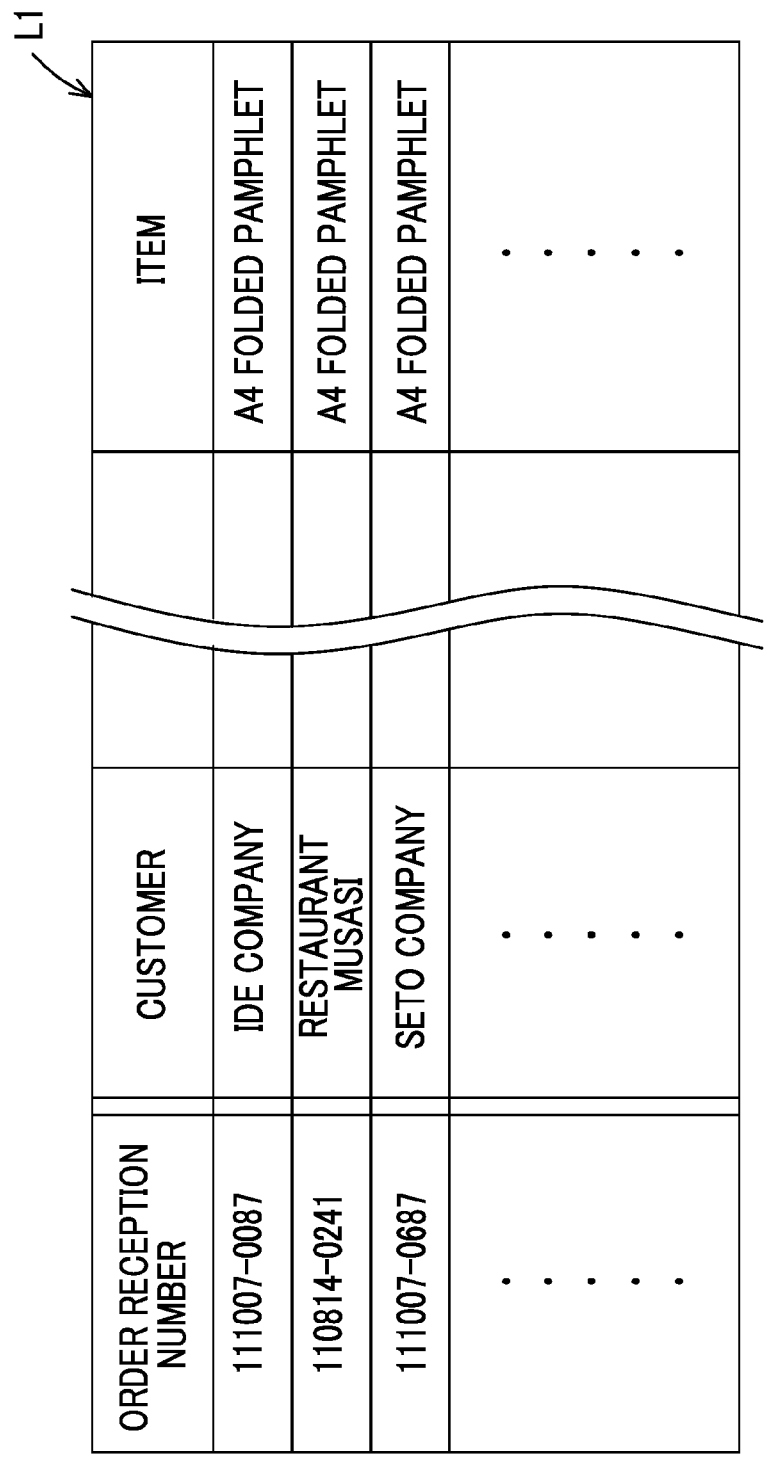
FIG. 7A is a schematic diagram of a job list.

Meanwhile, a ganging task state is monitored using the job list L1 and the ganging list L2. FIG. 7A is a schematic diagram of the job list L1, and FIG. 7B is a schematic diagram of the ganging list L2 in an initial state.

The job list L1 illustrated in FIG. 7A is a list in which a plurality of print jobs satisfying a predetermined condition are extracted from all print jobs stored in the server apparatus 16. For example, a print job of which a due date is set within a predetermined time range (specifically, within a week) counting from the present time is extracted. In addition, the job list L1 is basically provided with the respective condition categories (the order reception number, the customer, the due date, the number of color plates, the quantity, the paper type, the grain direction, the development size, and the item) of the information column 86 (refer to FIG. 4). Further, for convenience of description, in relation to the information column 86 illustrated in FIG. 4, an arrangement order of print jobs is appropriately changed and is expressed.

The ganging list L2 illustrated in FIG. 7B is a list indicating a correspondence relationship between an attribute of a generated and registered ganging task and an assignment state of a print job. The ganging list L2 includes, specifically, a region number, a ganging task (name), a paper type, a grain direction, a quantity, a development size, and an assigned job (the name of an assigned job).

Hereinafter, a detailed description will be made of an operation of the ganging setting unit 56 when a ganging task is executed with reference to the state transition diagram of FIG. 8.

An operation of the ganging setting unit 56 starts when the event of the "ganging task generation" (step S2 of FIG. 3) occurs. First, transition to a "ganging state monitoring" mode is performed, and, then, when each event is generated, sequential transition is performed between three modes, the "ganging state monitoring" mode, a "list update" mode, and a "ganging setting" mode.

The "ganging state monitoring" mode is a mode for monitoring a ganging state for each ganging task. Specifically, the ganging state monitoring unit 66 monitors contents of the job list L1 and the ganging list L2 and sequentially determines whether or not there is a print job which can be assigned to the scheduled disposition region R1 or the like which is in a blank state. Hereinafter, for convenience of description, this mode is simply referred to as a "monitoring mode" in some cases.

The "list update" mode is a mode for updating the contents of the job list L1 and the ganging list L2. Specifically, the ganging information managing unit 60 acquires the job list L1 and the ganging list L2 in a timely manner at a predetermined timing, and sequentially updates the contents thereof. Hereinafter, for convenience of description, this mode is simply referred to as an "update mode" in some cases.

The "ganging setting" mode is a mode for setting ganging. Specifically, the job assigning unit 64 assigns a single print job which satisfies a disposition approval condition to the scheduled disposition region R1 or the like which is in a blank state. Hereinafter, for convenience of description, this mode is simply referred to as a "setting mode" in some cases.

The ganging state monitoring unit 66 determines whether or not there is at least one combination of print jobs and the scheduled disposition regions R1 to R4 which have not been assigned yet. This determination operation will be described in detail.

First, the ganging state monitoring unit 66 refers to the contents of the job list L1 (refer to FIG. 7A) and the ganging list L2 (refer to FIG. 7B). Specifically, the ganging state monitoring unit 66 extracts the scheduled disposition region R1 (the region number "1") in which the content of "assigned job" is "NULL" (blank state). In addition, the ganging state monitoring unit 66 searches whether or not a print job satisfying a disposition approval condition for the region number "1" in the ganging list L2 is present in the job list L1. The disposition approval condition in the present embodiment corresponds to a case of totally conforming to specific condition categories (the paper type, the grain direction, and the development size). In addition, the disposition approval condition is not limited thereto and may be appropriately modified. Further, the ganging state monitoring unit 66 may perform a search (determine whether or not there is a combination) in order beginning with a print job having the earliest due date is early. This can prevent in advance a possibility that a due date of the printed matter 30 may lapse.

The ganging state monitoring unit 66 extracts three print job candidates of which order reception numbers are "111007-0087", "110814-0241", and "111007-0687" as a result of the search. The ganging state monitoring unit 66 also obtains the same search result for the other scheduled disposition regions, more specifically, the scheduled disposition region R2 (the region number "2"), the scheduled disposition region R3 (the region number "3"), and the scheduled disposition region R4 (the region number "4").

As indicated by the transition line T1, in a case where there is at least one print job candidate, transition is performed from the monitoring mode to the setting mode. In addition, during the setting, the setting mode is maintained without mode transition (refer to the transition line T2).

In response to a predetermined operation (clicking of the [assign] button 124) on the setting screen 120 of FIG. 6, in the present embodiment, the job assigning unit 64 assigns the print job "111007-0087" to the first scheduled disposition region R1, to assign the print job "110814-0241" to the second scheduled disposition region R2, and to assign the print job "111007-0687" to the third scheduled disposition region R3.

Figure 9:
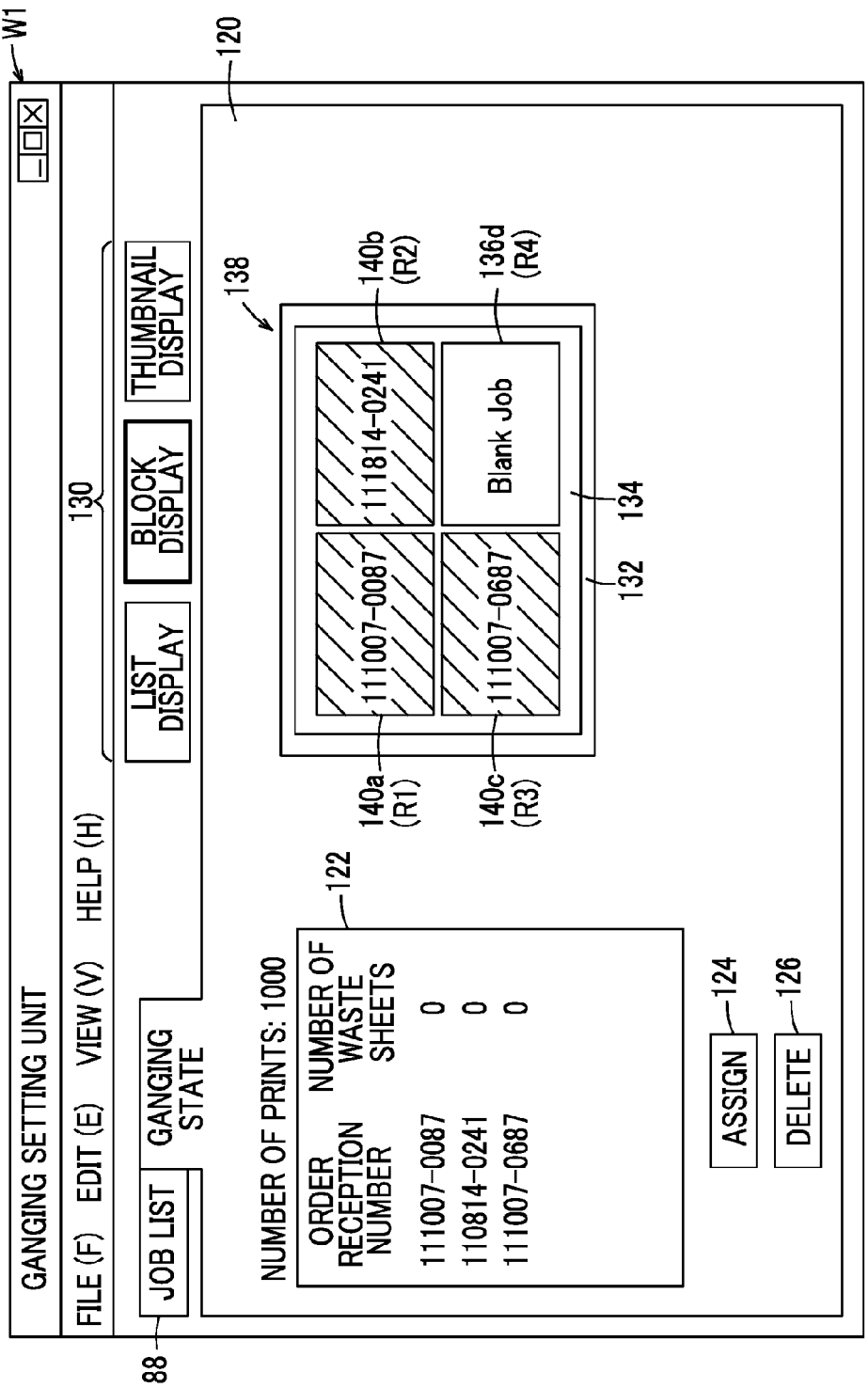
FIG. 9 is an image view illustrating a third state of the setting screen.

In response to a clicking operation of the [assign] button 124, the display control unit 44 replaces the simulation image 128 with a new simulation image 138 illustrated in FIG. 9 which is displayed on the display unit 46. Before the display, the simulation image generating unit 70 generates the simulation image 138 (refer to FIG. 9) on which the assignment result is reflected. Then, the screen generating unit 68 generates display data of the setting screen 120, a part of which is replaced, and supplies the display data to the display control unit 44.

The simulation image 138 of which form is changed is newly disposed at a predetermined position on the setting screen 120 of FIG. 9. The simulation image 138 includes content images 140*a* to 140*c* instead of the content images 136*a* to 136*c*. The names of the assigned print jobs are respectively expressed in the content images 140*a* to 140*c*, and the background parts thereof (indicated by hatching in the example of this figure) are colored in a second color different from the first color. Thereby, the operator can understand at a glance that a ganging state of the scheduled disposition regions R1 to R3 is changed from the "blank state" to an "assigned state".

As indicated by the transition line T3, in a case where the settings of ganging are changed, transition is performed from the setting mode to the update mode. In addition, during the update, the update mode is maintained without mode transition (refer to the transition line T4).

Figure 10:
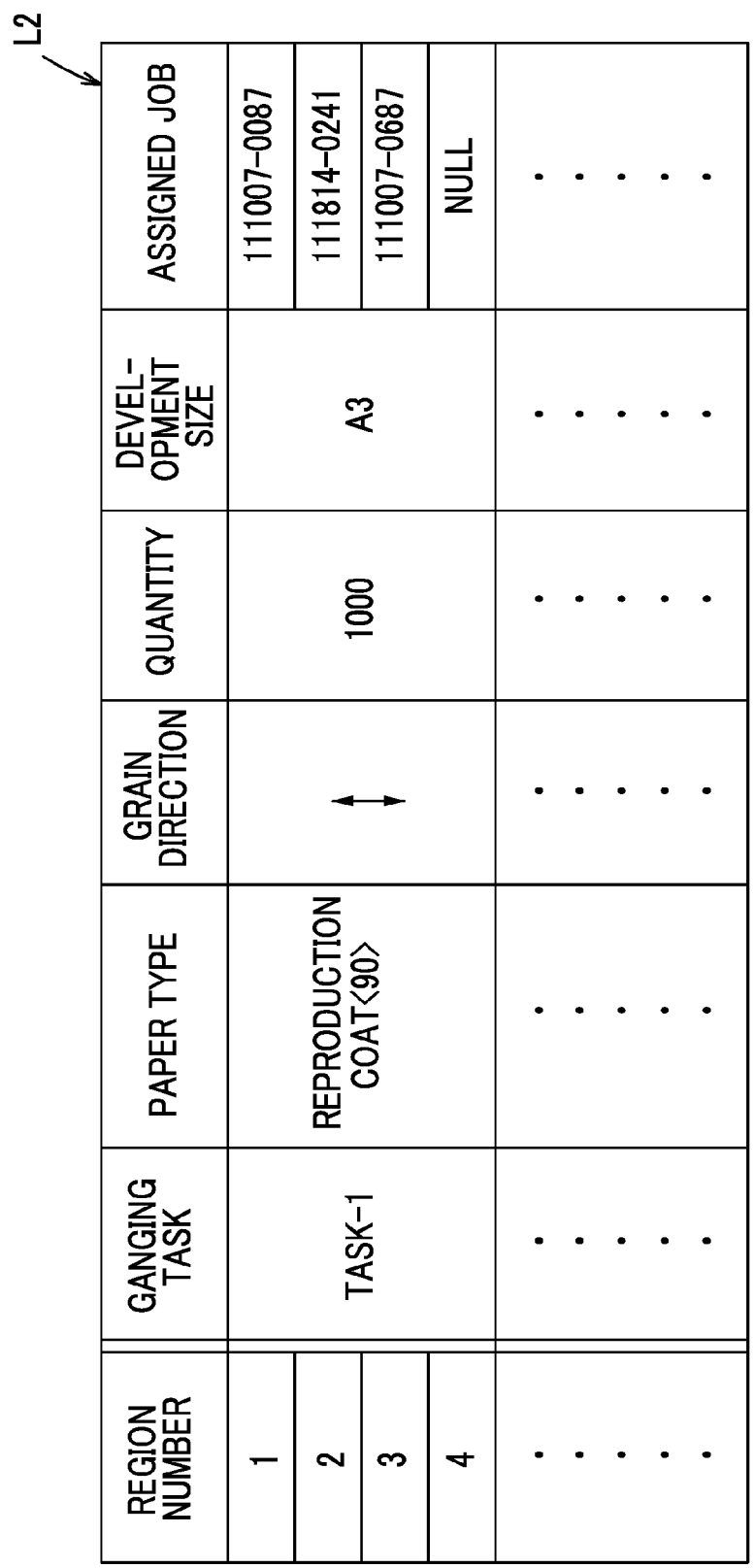
FIG. 10 is a schematic diagram of an updated ganging list.

The ganging information managing unit 60 updates the ganging list L2, specifically, the contents of "assigned job" illustrated in FIG. 7B, based on the process result by the job assigning unit 64. As a result, as illustrated in FIG. 10, the contents of "assigned job" corresponding to the region numbers "1" to "3" are respectively updated.

As indicated by the transition line T5, when the updating of the ganging list L2 is completed, transition is performed from the update mode to the monitoring mode. In addition, the ganging state monitoring unit 66 monitors the contents of the job list L1 (refer to FIG. 7A) and the ganging list L2 (refer to FIG. 10) again. As a result, the ganging state monitoring unit 66 determines that there is no print job which conforms to the condition categories (the paper type, the grain direction, and the development size) of the scheduled disposition region R4 (the region number "4") in the job list L1. In this case, the monitoring mode is maintained without mode transition (refer to the transition line T6). In addition, monitoring timing (an execution cycle, an event, and the like) may be arbitrarily set.

While the monitoring mode is executed, the operator can use other application software installed in the DTP apparatus 18. In this case, the operator may appropriately perform other operations such as the imposition process (refer to step S1 of FIG. 3) and the creation of a new ganging task (refer to step S2 FIG. 3) without the need for watching the display content of the window W1 (refer to FIG. 9 or the like).

Successively, a new print job "080502-0611" is assumed to be registered according to the update of the job list L1. In addition, this print job is assumed as a job which conforms to the condition categories (the paper type, the grain direction, and the development size) of the scheduled disposition region R4 (the region number "4"), and the quantity is 800 sheets.

In this case, after the transition along the transition lines T7 and T5, the ganging state monitoring unit 66 extracts the print job "080502-0611" as a single print job candidate. In addition, the screen generating unit 68 generates display data of an informing image 150 and supplies the display data to the display control unit 44. Further, the display control unit 44 displays the window W3 in a pop-up form on the display unit 46.

Figure 11:
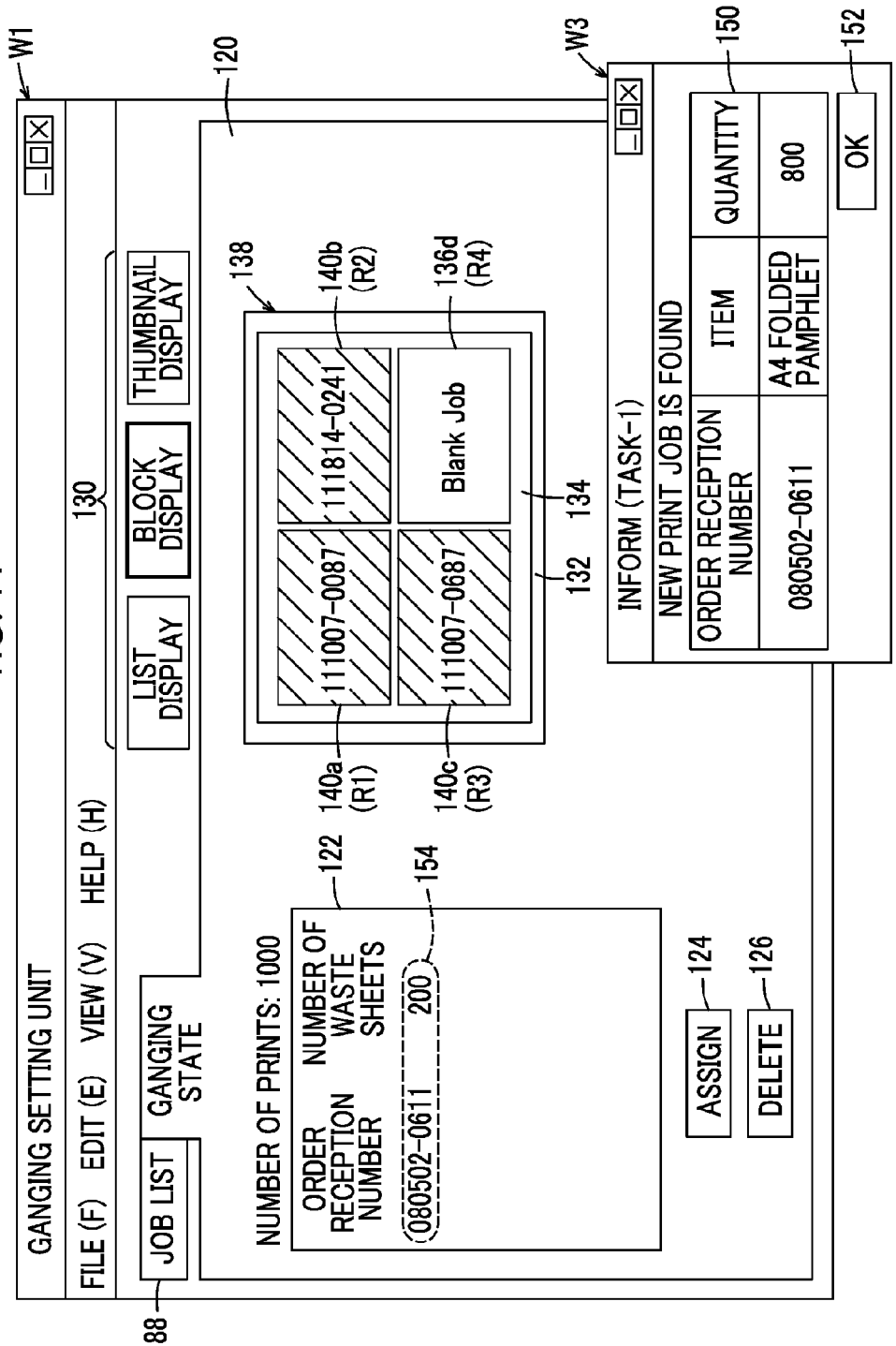
FIG. 11 is an image view illustrating a fourth state of the setting screen.

As illustrated in FIG. 11, the informing image 150 which informs the operator that there is a combination of the scheduled disposition region R4 and the print job in the ganging task "TASK-1" is disposed on the window W3. In other words, the informing image 150 indicates that the print job "080502-0611" is a candidate of ganging (assignment). New character information 154 corresponding to the print job "080502-0611" is displayed in the information column 122 on the setting screen 120 in tandem with the display operation of the window W3. In addition, in response to a clicking operation of the [OK] button 152, the display control unit 44 closes the window W3 so as to hide the window W3.

Thereby, even in a case where other operations are performed using the DTP apparatus 18, the operator's attention can be drawn by displaying the window W3 in a pop-up form. In addition, means for informing the operator as a user is not limited to displaying visual information including an image, and, for example, a sound may be output via the speaker 50 (refer to FIG. 2).

In addition, the operator who recognizes the presence of the print job candidate judges whether or not to employ this print job. In response to a clicking operation of the [assign] button 124, the job assigning unit 64 assigns the fourth scheduled disposition region R4 to the print job "080502-0611". Next, after the transition along the transition line T3, the ganging list L2 is updated and the ganging task is completed.

On the other hand, since the selection of the print job "080502-0611" causes the generation of 200 waste sheets, the operator may not employ this print job. In this case, in response to a clicking operation of the [delete] button 126, the monitoring mode is continued following the transition along the transition line T8. Thereafter, the operator may perform other operations using the DTP apparatus 18 until the window W3 is displayed again. Alternatively, if the operator desires to temporarily suspend judgment on the spot, the operator may perform other operations in a state in which the window W3 is displayed.

However, in a case where there is no single content image satisfying the disposition approval condition for the scheduled disposition region R4, the scheduled disposition region R4 may be divided into a plurality of regions, and then a print job may be assigned.

For example, the scheduled disposition region R4 of which the development size is an A3 size is equally divided into two, and thereby two scheduled disposition regions (not illustrated) of which each development size is an A4 size are formed. On the other hand, there has already been a print job "090809-0839" satisfying a disposition approval condition for two scheduled disposition regions in the job list L1.

In this case, the ganging state monitoring unit 66 extracts the print job "090809-0839" as a single print job candidate. In addition, the screen generating unit 68 generates display data of an informing image 160 and supplies the display data to the display control unit 44. Further, the display control unit 44 displays the window W3 in a pop-up form on the display unit 46.

Figure 12:
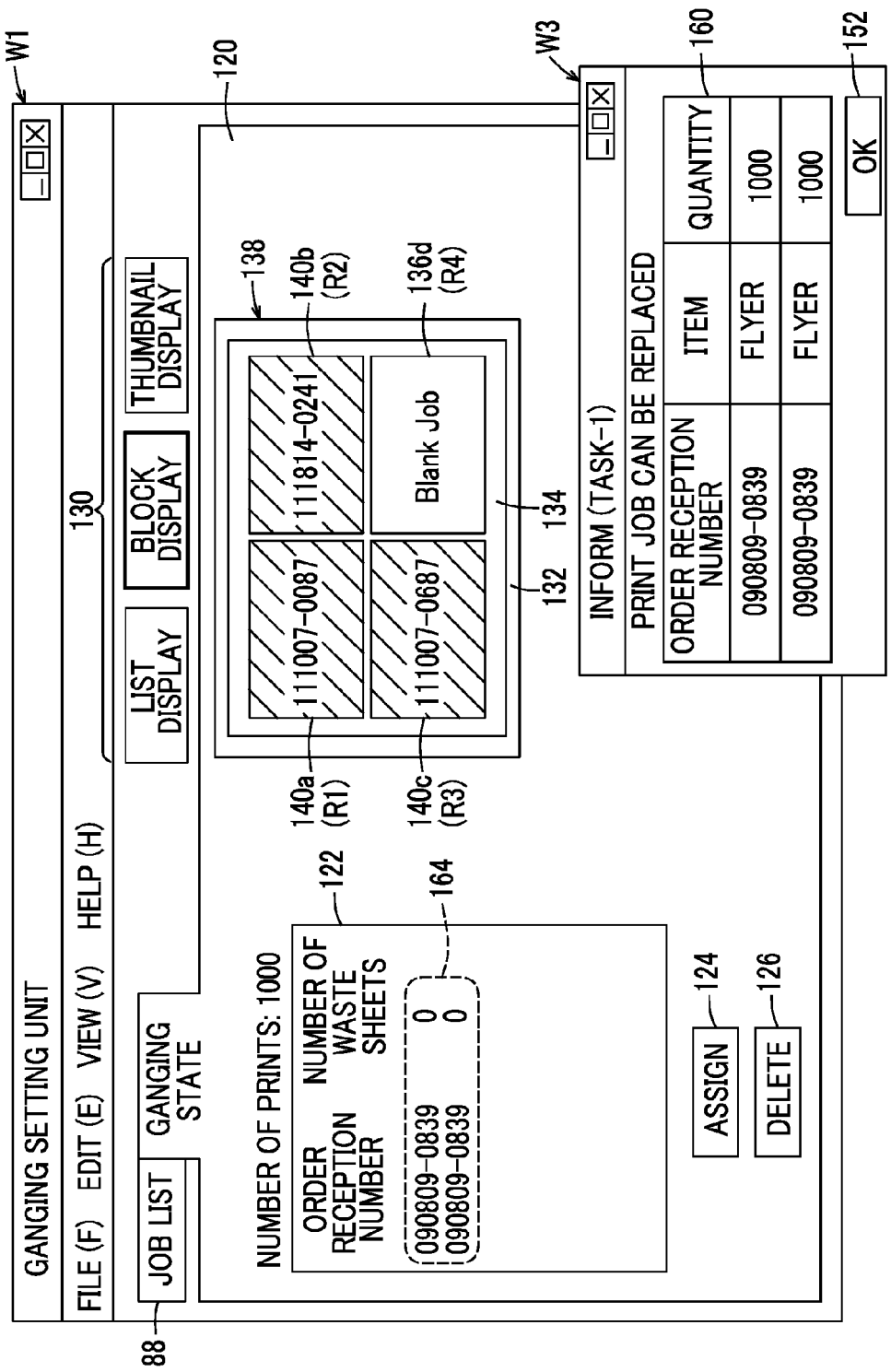
FIG. 12 is an image view illustrating a fifth state of the setting screen.

As illustrated in FIG. 12, the informing image 160 which informs the operator that the print job (or the scheduled disposition region R4) is replaced in the ganging task "TASK-1" is disposed on the window W3. In other words, the informing image 160 indicates that the print job "090809-0839" is a candidate of ganging (assignment). New character information 164 corresponding to the print jobs "090809-0839" and "090809-0839" is displayed in the information column 122 on the setting screen 120 in tandem with the display operation of the window W3. In addition, in response to a clicking operation of the [OK] button 162, the display control unit 44 closes the window W3 so as to hide the window W3.

In addition, since the "quantity" of the print job "090809-0839" is 2000 sheets, this print job is treated as two print jobs each of which has the quantity of distributed 1000 sheets. As such, the ganging state monitoring unit 66 may divide the scheduled disposition region R4 which has not been assigned yet into a plurality of regions and determine whether or not there is the combination. Thereby, the ganging work can be prevented from being stagnant even in a case where a print job appropriate for the scheduled disposition region R4 is not found.

In step S4, the ganging setting unit 56 determines whether or not the ganging is completed. If it is determined that the ganging is completed, the ganging setting unit 56 finishes the ganging task. Next, the DTP apparatus 18 transmits the obtained ganging information to an external device via the communication I/F 42 so as to have the ganging information stored in the server apparatus 16.

In step S5, proofreading and printing processes are performed. The RIP apparatus 20 performs a rasterization process on proofreading data (or proofreading-completed data) which is obtained through ganging, based on the ganging information fixed in step S4, and supplies processed printing data to the proof press 24 (or the plate setter 28) side. Thereby, the proof press 24 (or the offset printer 32) can form the proof 22 (or the printed matter 30).

As described above, provided are the ganging information managing unit 60 which sequentially manages the job list L1 regarding a plurality of print jobs and the ganging list L2 regarding assignment states of respective print jobs corresponding to the scheduled disposition regions R1 to R4; the job assigning unit 64 which assigns at least one print job satisfying a predetermined disposition approval condition to the scheduled disposition regions R1 to R4 among a plurality of print jobs indicated by the job list L1; the ganging state monitoring unit 66 which sequentially monitors the job list L1 and the ganging list L2 managed by the ganging information managing unit 60 and determines whether or not there is at least one combination of print jobs and the scheduled disposition regions R1 to R4 which have not been assigned yet by the job assigning unit 64; and the monitoring result informing unit (the display unit 46 and the speaker 50) for informing a user of there being the combination when the ganging state monitoring unit 66 determines that there is the combination.

As described above, since the job list L1 and the ganging list L2 which are managed are sequentially monitored and it is determined whether or not there is at least one combination of a print job which has not been assigned yet and the scheduled disposition regions R1 to R4, a gradual ganging work can be executed depending upon circumstances of print jobs which are sequentially managed. In addition, in a case where it is determined that there is a combination in which the assignment has not been performed yet, a user is informed of there being the combination. Accordingly, it is possible to reduce a frequency of states in which the ganging work performed with the units of the printing plate 26 or the paper 36 is in progress. Thereby, an oversight or the like due to carelessness of a user can be prevented and efficiency of the ganging work can be further improved.

Next, a modified example of the image editing apparatus (the DTP apparatus 18) according to the present embodiment will be described with reference to FIG. 13.

Figure 13:
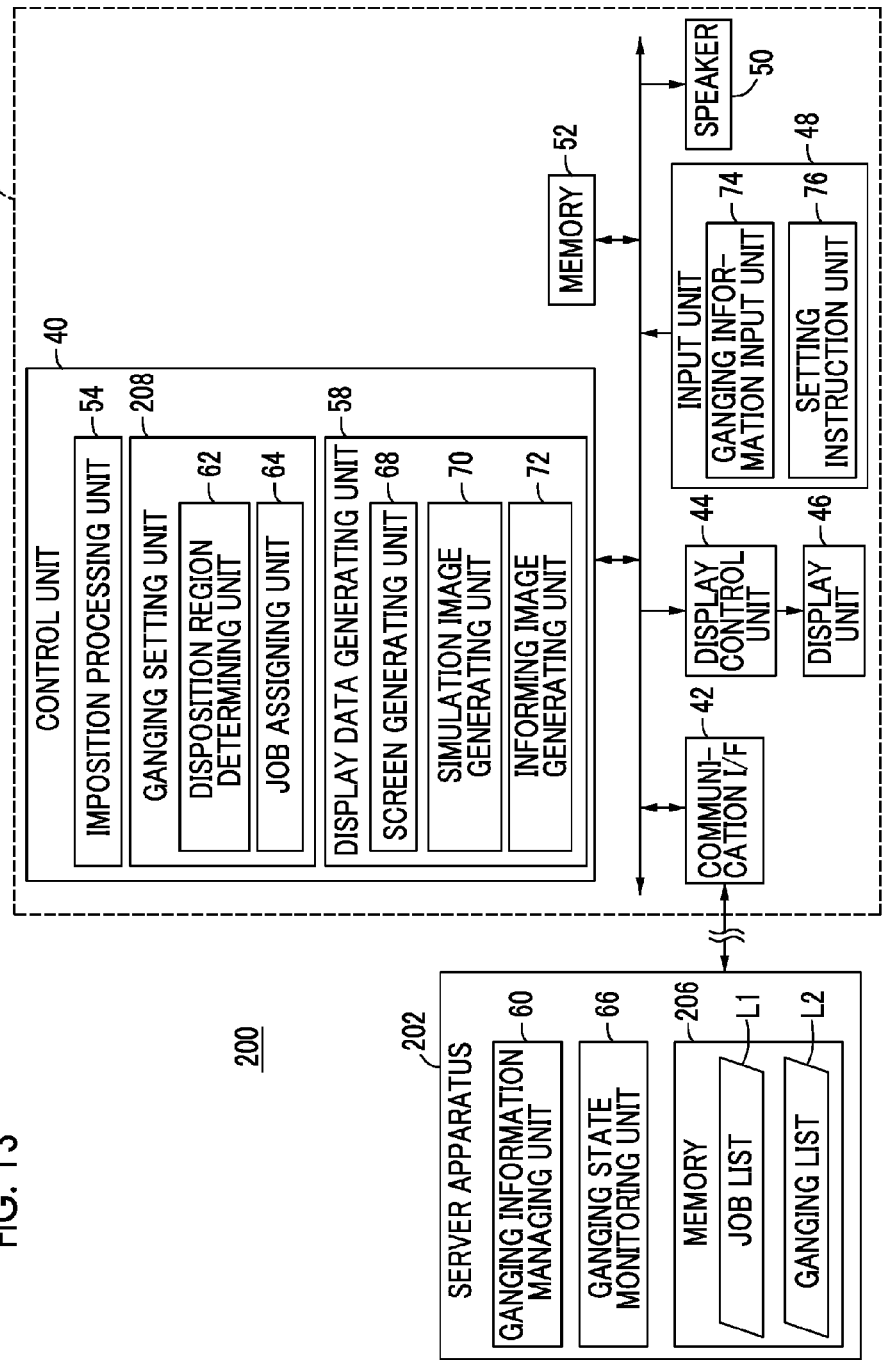
FIG. 13 is a block diagram of an image editing system according to a modified example.

An image editing system 200 illustrated in FIG. 13 is built in the printed matter producing system 10. The image editing system 200 includes a server apparatus 202 and a DTP apparatus 204.

The server apparatus 202 has some of the functions of the DTP apparatus 18 of FIG. 2. Specifically, the server apparatus 202 includes the ganging information managing unit 60, the ganging state monitoring unit 66, and a memory 206 storing the job list L1 and the ganging list L2 therein. On the other hand, the DTP apparatus 204 has approximately equivalent functions as the DTP apparatus 18 (refer to FIG. 2). However, a ganging setting unit 208 includes only the disposition region determining unit 62 and the job assigning unit 64.

Figure 8:
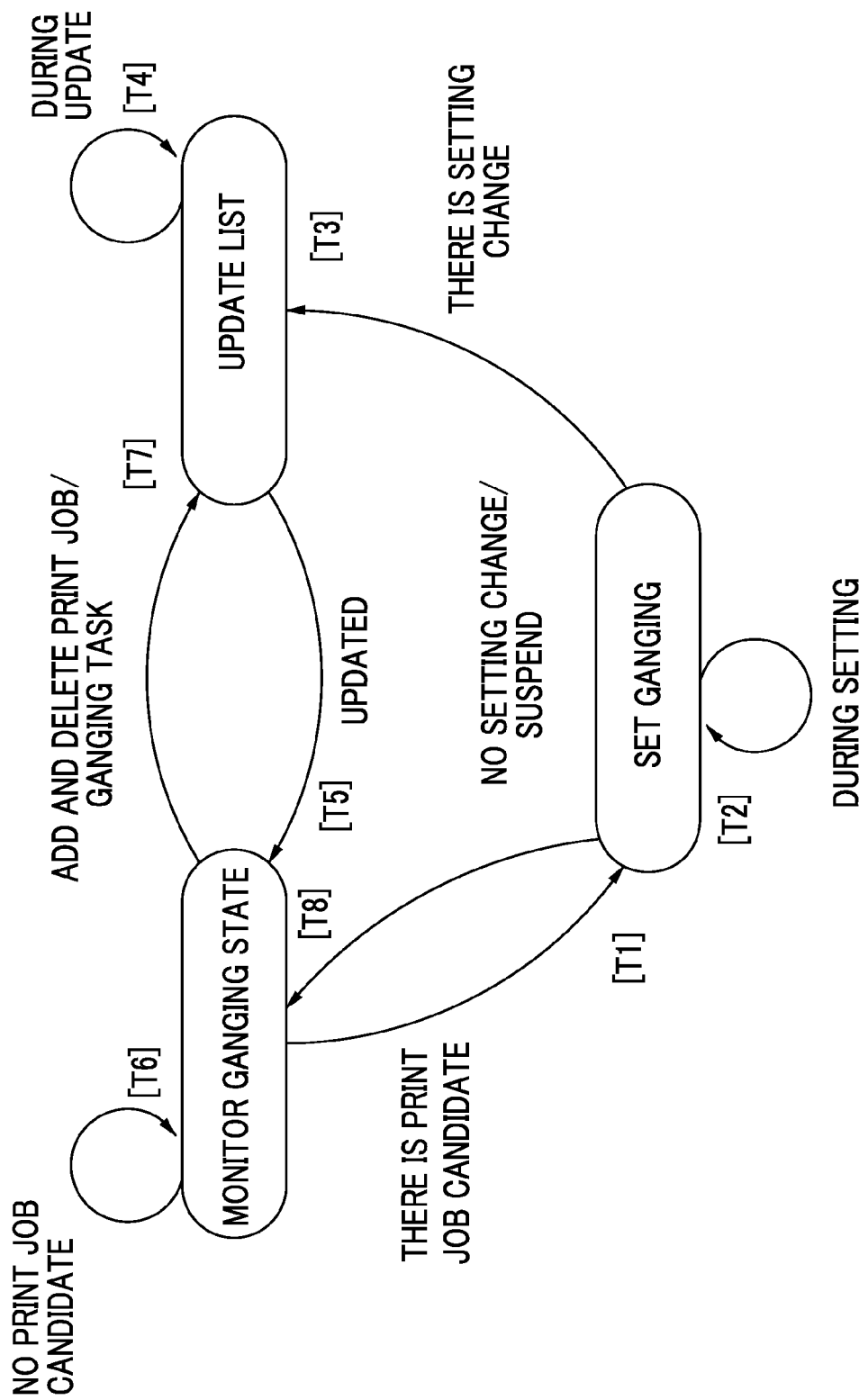
FIG. 8 is a state transition diagram illustrating an operation of a ganging setting unit when a ganging task is executed.

With this configuration, the operation illustrated in FIG. 8 is executed by the server apparatus 202. That is to say, ganging information is transmitted and received between the server apparatus 202 and the DTP apparatus 204 in a timely manner, and thereby the same operations and effects as in the present embodiment can be achieved.

In addition, the present invention is not limited to the above-described embodiment, and various modifications may be made without departing from the concepts of the invention.

What is claimed is:

1. An image editing apparatus configured to determine two or more scheduled disposition regions, which do not overlap each other, in a predetermined region on a printing plate or an output medium, and gang two or more content images for the respective scheduled disposition regions, comprising:
   a ganging information managing unit that sequentially manages first list information regarding a plurality of print jobs and second list information regarding assignment states of the print jobs corresponding to the respective scheduled disposition regions;
   a job assigning unit that assigns the scheduled disposition regions to at least one print job satisfying a predetermined disposition approval condition among the plurality of print jobs indicated by the first list information;
   a ganging state monitoring unit that sequentially monitors the first list information and the second list information managed by the ganging information managing unit and determines whether or not there is at least one combination of the print jobs which have not been assigned yet by the job assigning unit and the scheduled disposition regions; and
   a monitoring result informing unit that informs a user of there being the combination in a case where the ganging state monitoring unit determines that there is the combination.

2. The image editing apparatus according to claim 1, further comprising:
   a simulation image generating unit that generates a simulation image, which is an image imitating a form of ganging on the printing plate or the output medium and which indicates an assignment state of each of the print jobs in an identifiable manner.

3. The image editing apparatus according to claim 1, wherein the first list information includes due dates of printed matters regarding the print jobs, and
   wherein the ganging state monitoring unit determines whether or not there is the combination in chronological order beginning with the print job having an earliest due date.

4. The image editing apparatus according to claim 2, wherein the first list information includes due dates of printed matters regarding the print jobs, and
   wherein the ganging state monitoring unit determines whether or not there is the combination in chronological order beginning with the print job having an earliest due date.

5. An image editing method for determining two or more scheduled disposition regions, which do not overlap each other, in a predetermined region on a printing plate or an output medium and ganging two or more content images for the respective scheduled disposition regions, comprising:
   sequentially managing first list information regarding a plurality of print jobs and second list information regarding assignment states of the print jobs corresponding to the respective scheduled disposition regions;

assigning the scheduled disposition regions to at least one print job satisfying a predetermined disposition approval condition among the plurality of print jobs indicated by the first list information;

sequentially monitoring the managed first list information and second list information so as to determine whether or not there is at least one combination of the print jobs which have not been assigned yet and the scheduled disposition regions; and informing a user of there being the combination in a case where it is determined that there is the combination.

6. An image editing system configured to determine two or more scheduled disposition regions, which do not overlap each other, in a predetermined region on a printing plate or an output medium and gang two or more content images for the respective scheduled disposition regions, comprising:

a ganging information managing unit that sequentially manages first list information regarding a plurality of print jobs and second list information regarding assignment states of the print jobs corresponding to the respective scheduled disposition regions;

a job assigning unit that assigns the scheduled disposition regions to at least one print job satisfying a predetermined disposition approval condition among the plurality of print jobs indicated by the first list information;

a ganging state monitoring unit that sequentially monitors the first list information and the second list information managed by the ganging information managing unit and determines whether or not there is at least one combination of the print jobs which have not been assigned yet by the job assigning unit and the scheduled disposition regions; and a monitoring result informing unit that informs a user of there being the combination in a case where the ganging state monitoring unit determines that there is the combination.

7. A non-transitory computer-readable recording medium storing therein a program that causes a computer to operate as an image editing apparatus configured to determine two or more scheduled disposition regions, which do not overlap each other, in a predetermined region on a printing plate or an output medium and to gang two or more content images for the respective scheduled disposition regions, the image editing apparatus comprising:

a ganging information managing unit that sequentially manages first list information regarding a plurality of print jobs and second list information regarding assignment states of the print jobs corresponding to the respective scheduled disposition regions;

a job assigning unit that assigns the scheduled disposition regions to at least one print job satisfying a predetermined disposition approval condition among the plurality of print jobs indicated by the first list information;

a ganging state monitoring unit that sequentially monitors the first list information and the second list information managed by the ganging information managing unit and determines whether or not there is at least one combination of the print jobs which have not been assigned yet by the job assigning unit and the scheduled disposition regions; and a monitoring result informing unit that informs a user of there being the combination in a case where the ganging state monitoring unit determines that there is the combination.

* * * * *